(12) United States Patent
O'Neill et al.

(10) Patent No.: US 10,503,672 B2
(45) Date of Patent: Dec. 10, 2019

(54) TIME DEPENDENT SERVICE LEVEL OBJECTIVES

(71) Applicant: EMC IP Holding Company LLC, Hopkinton, MA (US)

(72) Inventors: Thomas F. O'Neill, Acton, MA (US); Sanjib Mallick, Bangalore (IN); Arieh Don, Newton, MA (US); Vinay G. Rao, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/963,398

(22) Filed: Apr. 26, 2018

(65) Prior Publication Data

US 2019/0332554 A1    Oct. 31, 2019

(51) Int. Cl.
*G06F 13/16*    (2006.01)
*G06F 13/18*    (2006.01)

(52) U.S. Cl.
CPC .......... *G06F 13/1668* (2013.01); *G06F 13/18* (2013.01)

(58) Field of Classification Search
None
See application file for complete search history.

(56) References Cited

U.S. PATENT DOCUMENTS

| | | | | |
|---|---|---|---|---|
| 9,258,242 | B1* | 2/2016 | Mallick | H04L 47/2425 |
| 9,465,550 | B1* | 10/2016 | Lippitt | G06F 3/0613 |
| 9,712,404 | B2* | 7/2017 | Ozaki | H04L 43/04 |
| 9,946,465 | B1* | 4/2018 | Martin | G06F 3/061 |
| 10,095,425 | B1* | 10/2018 | Martin | G06F 3/0689 |
| 10,360,085 | B1* | 7/2019 | Mallick | G06F 9/545 |
| 2012/0317358 | A1* | 12/2012 | Ando | G06F 3/0605 711/117 |
| 2016/0004475 | A1* | 1/2016 | Beniyama | G06F 3/0605 710/74 |

OTHER PUBLICATIONS

Stephen Smaldone, et al., U.S. Appl. No. 15/876,143, filed Jan. 20, 2018, "Meeting Backup Window Requirements While Managing Storage Array Backup Load".

* cited by examiner

*Primary Examiner* — Michael Sun
(74) *Attorney, Agent, or Firm* — Muirhead and Saturnelli, LLC

(57) ABSTRACT

Described are techniques for processing I/O operations that may include: issuing, by a process of an application on a host, an I/O operation; tagging the I/O operation with a tag value in accordance with a process name associated with the process that issued the I/O operation; sending the I/O operation from the host to a data storage system; and determining, on the data storage system, an service level objective (SLO) for the I/O operation in accordance with the tag value of the I/O operation. The process name may include a first portion and a second customizable or configurable portion used to distinguish between different instance of the same application process. It may be determined which of multiple time-dependent SLOs for the process name is active and used with the I/O operation based on a receipt or processing time associated with the I/O operation.

20 Claims, 9 Drawing Sheets

| Application 402 | Process Name 404 | Host 406 | Tag 408 | SLO time-frame pair(s) 410 | |
|---|---|---|---|---|---|
| DB Application 410 | LOGWRITER_SALES | host1 | 1 | SLO diamond 8am-8pm M-W | 410a |
| | LOGWRITER_MKTG | host1 | 2 | SLO diamond 8am-8pm Th and Fri | 410b |
| | DBWRITER_SALES | host1 | 3 | SLO diamond June 1-7 | 410c |
| | DBWRITER_MKTG | host1 | 4 | SLO diamond Jan 30-31 | 410d |
| Email application 420 | EPROCA_1 | host2 | 5 | SLO diamond always | 420a |
| | EPROCB_1 | host2 | 6 | SLO bronze 8am-8pm | 420b |
| Backup application 430 | BUAGENT_1 | host1 | 7 | SLO bronze 8am-8pm<br>SLO diamond 8pm - 8 am | 430a |

Default SLOs 333: Default SLO SG1, DB application and Backup application = Gold
Default SLO SG2 and Email application=Gold

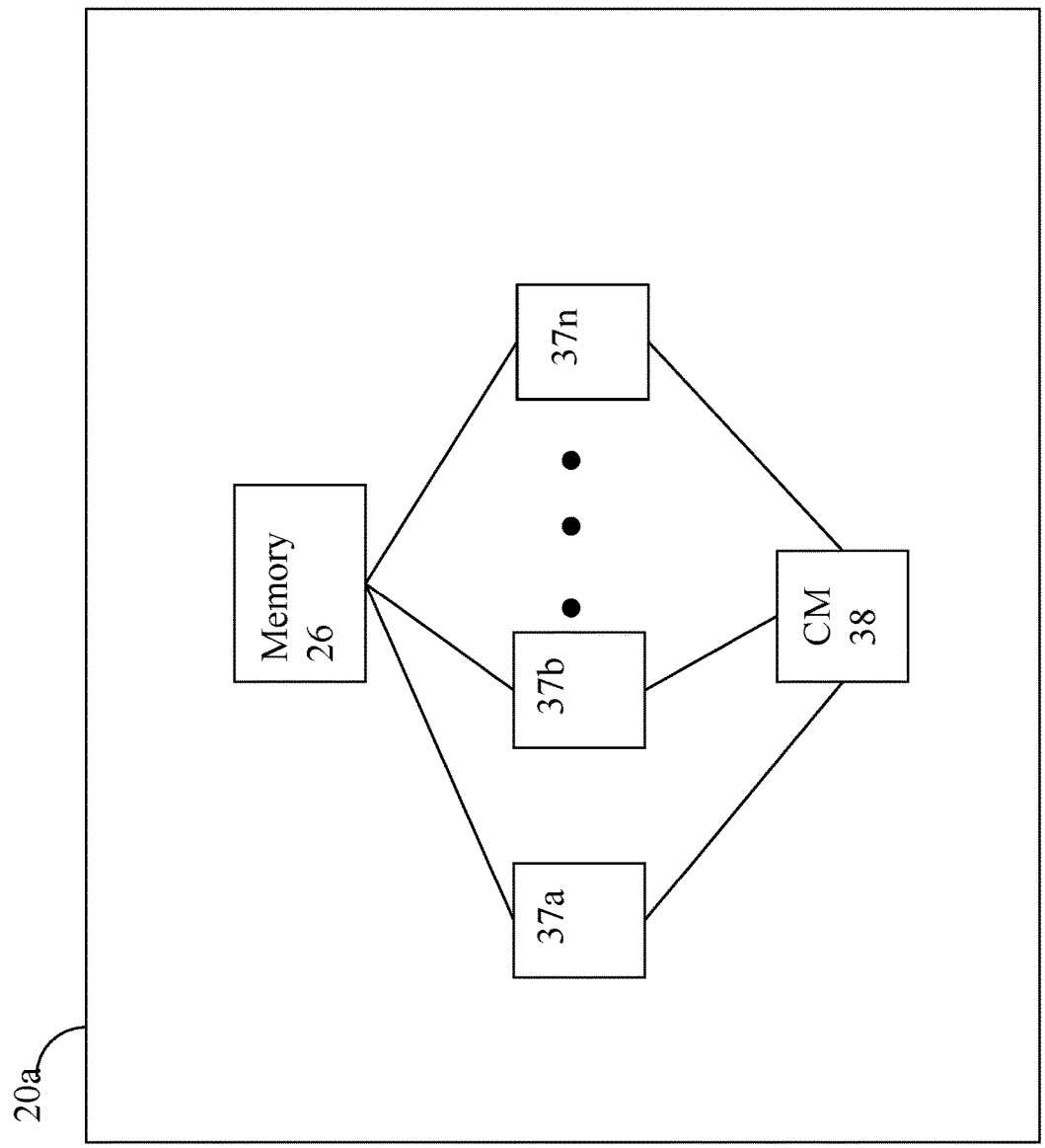

TIME DEPENDENT SERVICE LEVEL OBJECTIVES

BACKGROUND

Technical Field

This application generally relates to data storage and, in particular, specifying a service level objective (SLO) for one or more devices.

Description of Related Art

Data storage systems may include resources used by one or more host systems. Data storage systems and host systems may be interconnected by one or more communication connections such as in a network. These resources may include, for example, data storage devices such as those included in the data storage systems manufactured by Dell Inc. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of techniques herein is a method of processing I/O operations comprising: issuing, by a process of an application on a host, an I/O operation; tagging the I/O operation with a tag value in accordance with a process name associated with the process that issued the I/O operation; sending the I/O operation from the host to a data storage system; and determining, on the data storage system, an service level objective for the I/O operation in accordance with the tag value of the I/O operation. The tagging may be performed by a multi-path I/O driver of the host. The tag value may be used to distinguish between different processes. The tag value may be used to distinguish between different instances of a same process. The process name may include a first portion and a second portion, and wherein the first portion may denote a particular process of the application and the second portion may be a customized portion denoting a particular instance of the application. The host may include two instances of the application and two different instances of a same process, the process, executing on the host, and wherein the second portion of the process name may be used to distinguish between the two different instances of the same process of the application. The method may include receiving the I/O operation at the data storage system; and responsive to receiving the I/O operation, performing first processing that determines the service level objective for the I/O operation in accordance with the tag value of the I/O operation. A table may include entries of process names and, for each process name, an associated tag value and one or more associated service level objective-time frame pairs. The table may include a first entry for the process name and the first processing may further comprise determining, using the table and the tag value of the I/O operation, at least one associated service level objective-time frame pair, wherein the at least one associated service level object-time frame pair specifies a service level that is active or effective or the process name at particular points in time in accordance with time-specific criteria. The time-specific criteria may include any of: a particular day of a week, a particular date, a particular time of day, and a particular calendar day. The first processing may include determining that the at least one associated service level objective-time frame pair is currently not active or effective for the I/O operation whereby the I/O operation is received at the data storage system at a time which does not meet the time-specific criteria of the at least one associated service level objective-time frame pair; and responsive to determining that the at least one associated service level objective-time frame pair is currently not active or effective for the I/O operation, using a default service level objective for processing the I/O operation. The at least one associated service level objective-time frame pair may specify a higher service level objective than the default service level objective, and wherein the higher service level objective may be active or effective when the time-specific criteria is met by the I/O operation. The at least one associated service level objective-time frame pair may specify a lower service level objective than the default service level objective, and wherein the lower service level objective may be active or effective when the time-specific criteria is met by the I/O operation.

In accordance with another aspect of techniques herein is a system comprising: at least one processor; and a memory comprising code stored therein that, when executed by the at least one processor, performs a method of processing I/O operations comprising: issuing, by a process of an application on a host, an I/O operation; tagging the I/O operation with a tag value in accordance with a process name associated with the process that issued the I/O operation; sending the I/O operation from the host to a data storage system; and determining, on the data storage system, an service level objective for the I/O operation in accordance with the tag value of the I/O operation.

In accordance with another aspect of techniques herein is a computer readable medium comprising code stored thereon that, when executed, performs a method of processing I/O operations comprising: issuing, by a process of an application on a host, an I/O operation; tagging the I/O operation with a tag value in accordance with a process name associated with the process that issued the I/O operation; sending the I/O operation from the host to a data storage system; and determining, on the data storage system, an service level objective for the I/O operation in accordance with the tag value of the I/O operation. The tagging may be performed by a multi-path I/O driver of the host. The tag value may be used to distinguish between different processes. The tag value may be used to distinguish between different instances of a same process. The process name may include a first portion and a second portion, and wherein the first portion may denote a particular process of the application and the second portion may be a customized portion denoting a particular instance of the application. The host may include two instances of the application and two different instances of a same process, the process, executing on the host, and wherein the second portion of the process name may be used to distinguish between the two different instances of the same process of the application.

BRIEF DESCRIPTION OF THE DRAWINGS

Features and advantages of the present invention will become more apparent from the following detailed description of exemplary embodiments thereof taken in conjunction with the accompanying drawings in which:

FIG. 2B is a representation of the logical internal communications between the directors and memory included in one embodiment of data storage system of FIG. 2A;

DETAILED DESCRIPTION OF EMBODIMENT(S)

Figure 1:
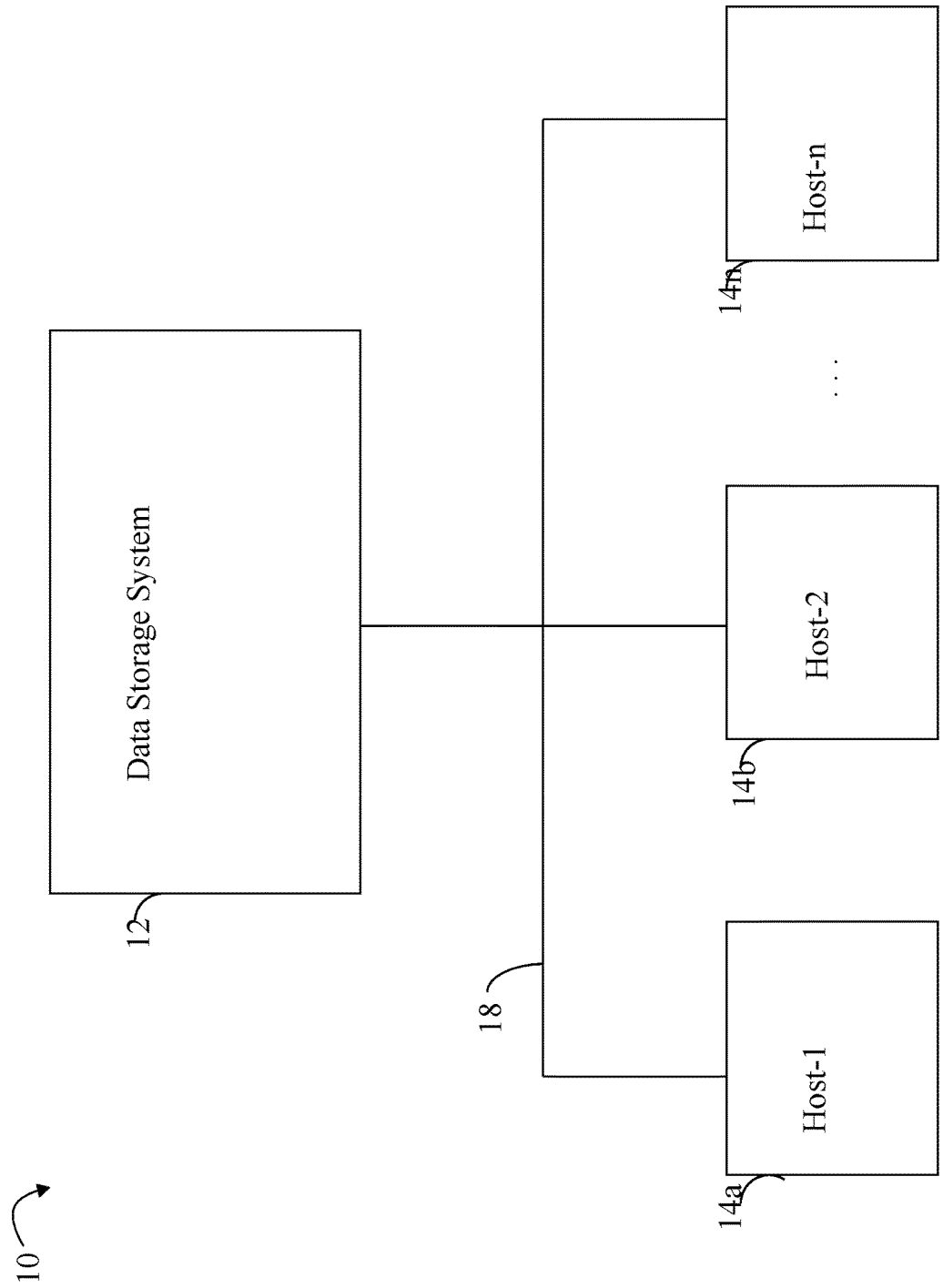
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix® VMAX® data storage system, as well one or more other data storage systems as may vary with the embodiment.

Figure 2A:
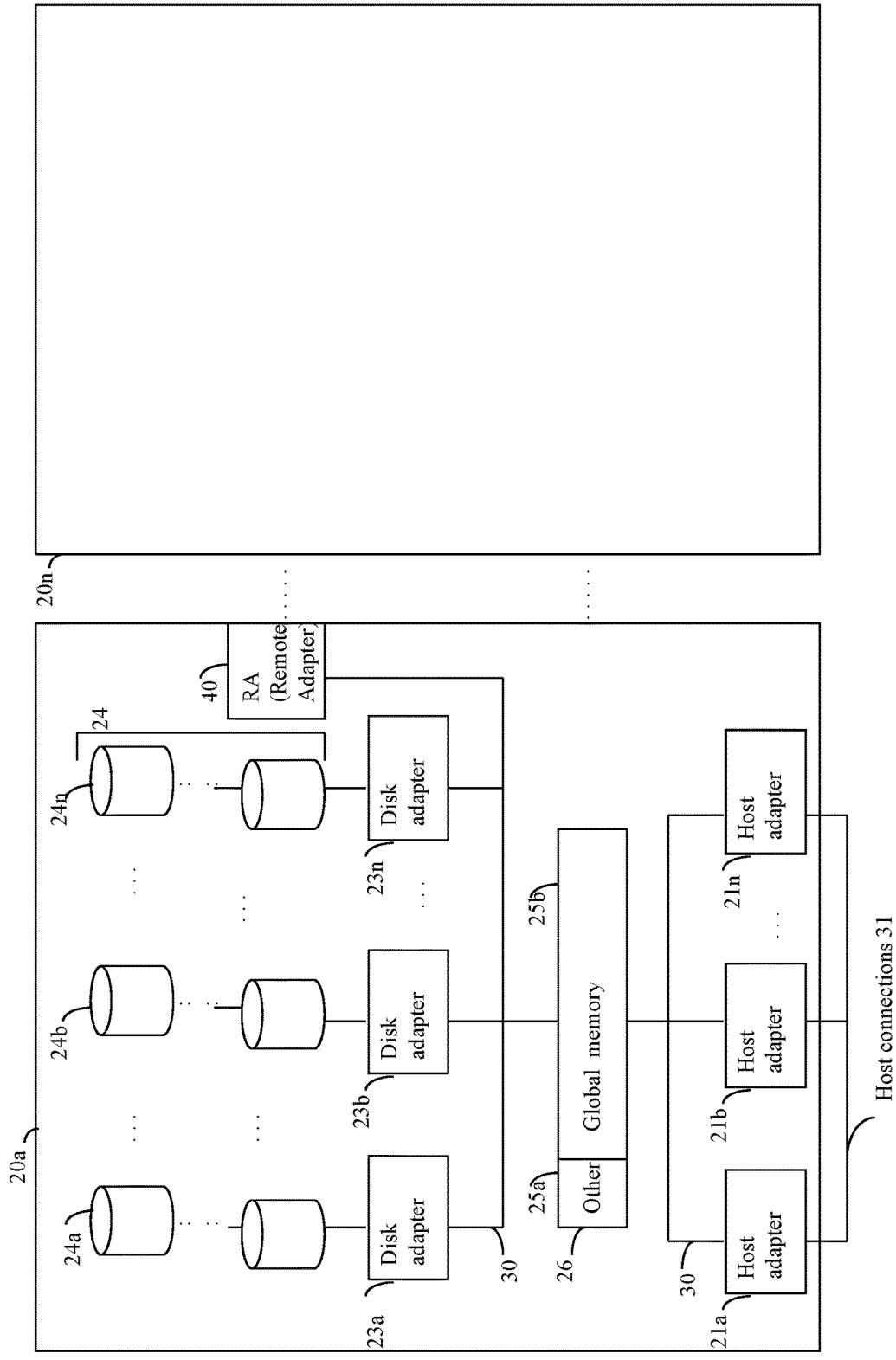
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system such as by EMC Corporation, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the back-end physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate. The DA may also be further characterized in at least one embodiment as a controller providing access to external physical drives or storage devices located on one or more external data storage systems rather than local physical drives located in the same physical storage system as the DA (such as illustrated in FIG. 2A).

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Figure 3:
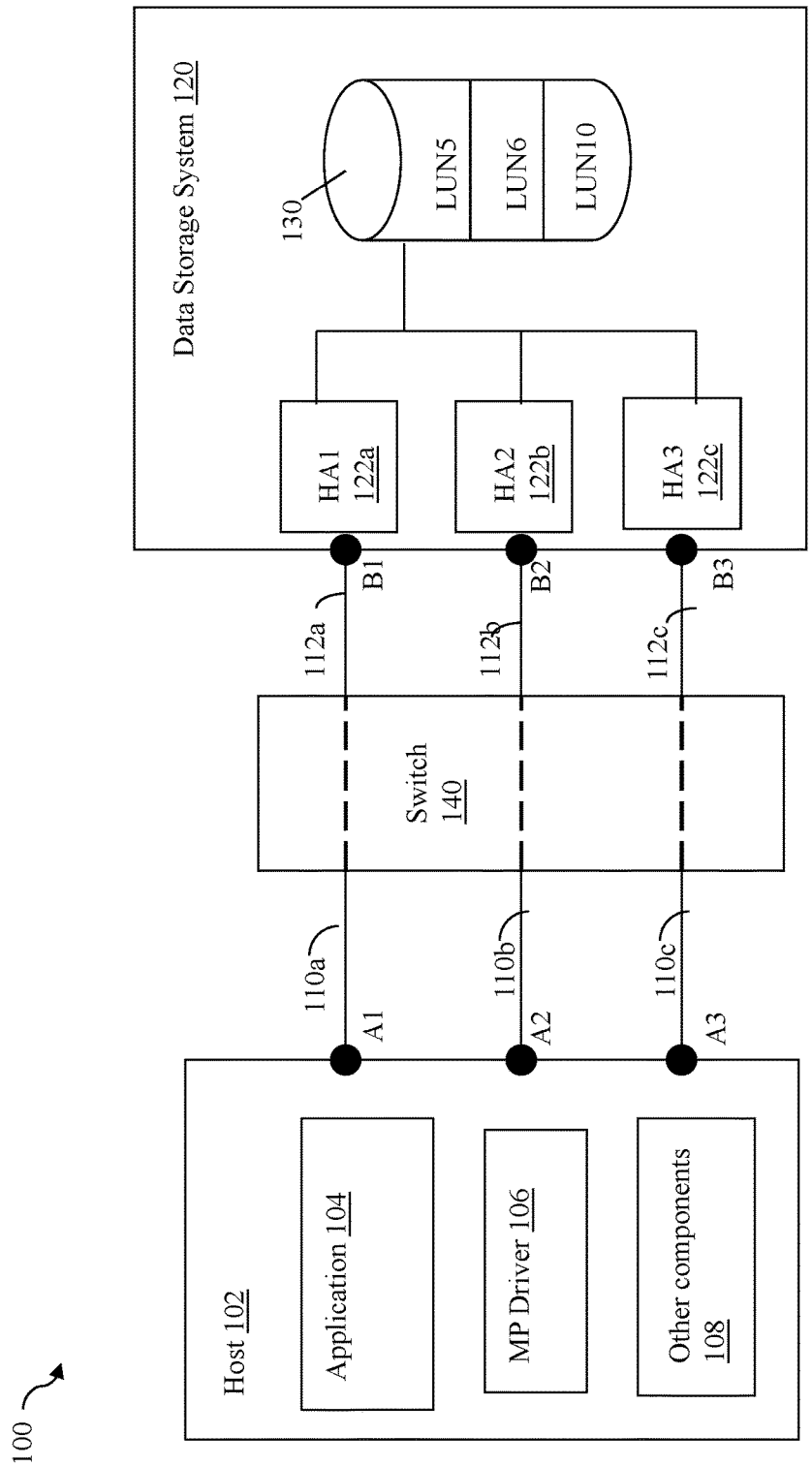
FIGS. 3, 5, 6 and 7 are examples of systems and components that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical storage device of the data storage system 120, such as a rotating disk drive, flash-based or other solid state storage device, and the like, where the physical storage device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein. For example, each of the LUNs may be configured to have storage provisioned from multiple different physical devices rather than a single physical device, and multiple hosts having multiple applications executing thereon may communicate with the data storage system.

It should be noted that following paragraphs and examples may refer to a particular examples using switch 140 having a switching fabric for simplicity of illustration, element 140 may be a single switch having a switching fabric, a multi-switch having a multi-switch fabric and the like. Thus, element 140 may more generally denote a network having its own connectivity fabric or network fabric where the network may include one or more components providing the connectivity between the host 102 and data storage system 120.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a target device, such as one of the LUNs of device 130, configured to be accessible to the host 102 over multiple physical paths. As such, each of the I/O operations may be forwarded from the application 104 to the data storage system 120 over one of the possible multiple paths. The MP driver 106 may include functionality to perform any one or more different types of processing such as related to encryption, multipathing, mirroring, migration, and the like. For example, the MP driver 106 may include multipathing functionality for management and use of multiple paths. For example, the MP driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure. The MP driver 106 may be included a commercially available product such as, for example, Dell® EMC® PowerPath® software by Dell Inc. The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC or SCSI driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through one or more paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing, such as described in more detail in following paragraphs, in addition to load balancing in connection with path selection. The MP driver 106 may be aware of, and may monitor, all paths between the host and the LUNs of the device 130 in order to determine which of the multiple paths are active or available at a point in time, which of the multiple paths are unavailable for communications, and to use such information to select a path for host-data storage system communications.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a port of an HA of the data storage system 120. Each of the LUNs of the device 130 may be accessible over three paths—a first path represented by A1-B1, a second path represented by A2-B2 and a third path represented by A3-B3.

Figure 4:
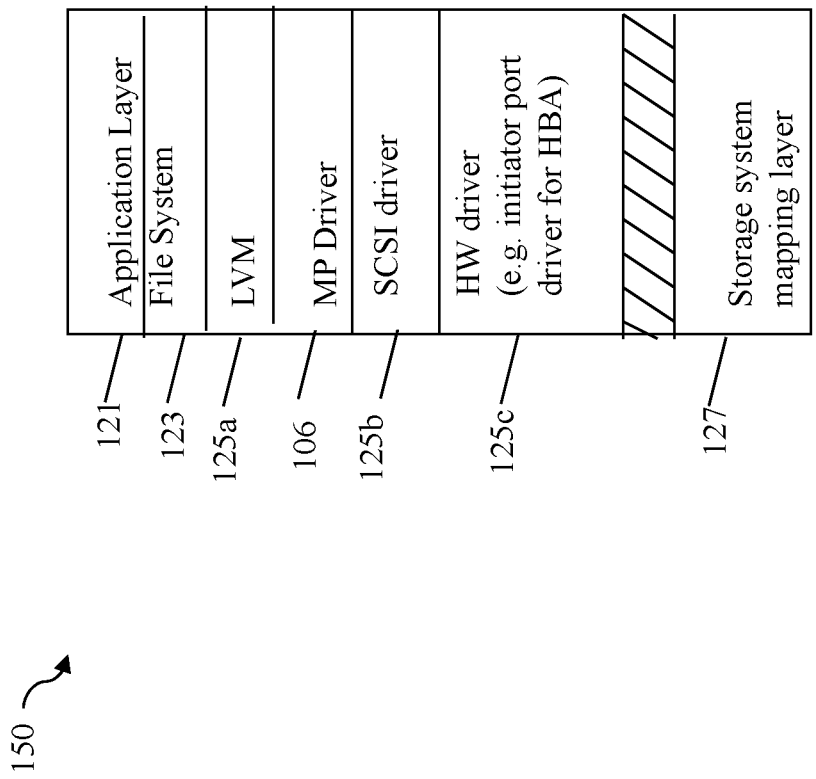
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3. The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as Dell® EMC® PowerPath® software. Functionality for performing multipathing operations such as may be performed by Dell® EMC® PowerPath® software may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI driver 125b and a hardware (HW) driver 125c. The SCSI driver 125b may handle processing of a received I/O request from the MP driver 106 such as related to forming a request in accordance with the SCSI standard. The driver 125c may be a HW driver that facilitates communication with hardware on the host. The driver 125c may be, for example, a driver for an HBA of the host which sends commands or requests to the data storage system and also receives responses and other communications from the data storage system.

It should be noted that an embodiment may also include mapping layers as in FIG. 4 with a variation that the ordering of the MP driver 106 and SCSI driver 125b may be reversed.

In some embodiments, the data storage system 120 of FIG. 3 may be an intelligent data storage system having its own mapping layer 127 such that the LUN known or exposed to the host may not directly correspond to a physical device such as a disk drive. In such embodiments, the LUN specified by the host in the command associated with the I/O operation may be further mapped by the data storage system using its mapping layer 127. For example, a LUN specified by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may executed in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, and the like. Additionally, the host may provide a virtualized environment and may execute, for example, VMware ESX or VMware ESXi software providing bare metal embedded hypervisors.

In operation, an application executing at application layer 121 may issue one or more I/O operations (e.g., read and write operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a.

In connection with an embodiment in accordance with techniques herein, communications between an initiator port of the host and a target port of a data storage system (e.g., target port of an HA) may include those related to I/O operations and other non-I/O commands such as related to host control operations. I/O operations may include, for example, read and write operations with respect to data stored on a LUN.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

The data storage system may provide a multi-tenant (MT) environment whereby multiple tenants store their data on the data storage system. In such an exemplary MT environment, a different service level objective or SLO may be specified for each tenant that defines a guaranteed performance level for the tenant. For example, an SLO may be related to a guaranteed level of performance with respect to I/O operations serviced at the data storage system. In this case, the SLO specified may be expressed in terms of one or more metrics, such as based on response time (RT). For example, the SLO specified for the tenant may include an average response time (RT) with respect to I/Os issued by the tenant. To further illustrate, an SLO may specify an average RT of 3 milliseconds (ms.) for the tenant whereby the tenant is guaranteed to have an average RT of 3 ms. for each LUN storing the tenant's data. The tenant may also be referred to as a consumer of the data storage system having its data stored on the data storage system. A single tenant or consumer may be, for example, an application executing on a host. A single host may have one or more applications. In at least one embodiment, an SLO may be specified for each logical group of one or more LUNs, such as a storage group (SG) of LUNs used by one or more applications.

Additionally, although examples and illustrations herein may refer to a RT specified as an SLO, it should be noted that an SLO may be specified using one or more other metrics other than RT. For example, I/O related SLOs may be specified in terms of guaranteed I/O throughput (e.g., I/O rate such as I/Os per second), data throughput (e.g., megabytes per second), and the like. An SLO, such as the RT SLO described herein, may be applied on a per LUN level (e.g., guaranteed for each LUN individually).

If an SLO is not being met whereby the average measured or observed RT exceeds the SLO specified RT, such an occurrence may also be referred to herein as an SLO violation. As just noted, an embodiment may define an SLO violation as described above where the measured performance is worse than as specified by the SLO metric. It should be noted that an embodiment may also more generally define an SLO violation as obtaining a first value for a performance metric, such as average RT, based on observed or measured performance values where the first value deviates more than a threshold amount from a specified SLO value for the performance metric. For example, the SLO may specify an average RT of 3 ms. An SLO violation may be determined if the average RT (as determined from observed RT values) deviates more than 0.5 ms. from the 3 ms. Thus, an SLO violation may be determined if the average RT based on such measured performance is outside of the RT range 3 ms.+/−0.5 ms. or outside the inclusive range of 2.5 ms. through 3.5 ms. An embodiment may specify the deviation threshold amount, such as 0.5 ms, as a percentage of the specified SLO metric value 3 ms., or as a numeric quantity (e.g., real number). Thus, as described in more detail elsewhere herein, an SLO violation may also occur in some embodiments if the measured or observed performance is better than as specified in the SLO. Responsive to an SLO violation, remediation processing may be performed to attempt to alleviate, and, if possible, eliminate, the SLO violation. Any suitable technique may be used to remove the SLO violation. For example, remediation processing may be performed to increase I/O performance of an application when the measured RT is greater than the specified SLO RT. For example, if the SG of LUNs has a measured average RT of 5 ms and an SLO of 3 ms, processing may be performed to increase performance of I/Os directed to such LUNs of the SG such as by allocating additional resources for use by the I/Os directed to the SG LUNs, storing or moving the data of the SG LUNs on higher performance physical storage (e.g., migrating or movement of the LUN data to flash-based storage devices), increasing processing priority of pending I/Os directed to such SG LUNs (e.g., giving such pending I/Os directed to the SG LUNs higher priority relative to priority of other pending I/Os directed to other SGs), and the like.

In current SLO implementations not in accordance with techniques herein, an SLO may be assigned to each defined logical group of one or more LUNs, as noted above. In such a system not using techniques herein (whereby the single SLO is specified for the defined logical group of LUNs), each/every I/O directed to any LUN of the logical group have the same SLO (as specified for the SG) regardless of the application that issued the I/Os and also regardless of time of day, day of the week, etc. In some cases, multiple applications on the same host may use the same SG of LUNs. However, it may be that each of the applications has different SLO requirements depending on the time of day, day of month, day of week, calendar date, and the like. For example, a database application and a backup agent may both reside on the same host accessing the same SG of LUNs. The DB application may use a single SLO that does not vary with time; and the backup agent may require different SLOs where the particular one of the SLOs in effect or enforced for the backup agent may vary with time of day (e.g., the backup agent has a lower SLO and thus higher performance requirement in effect during evening/non-workday hours than during workday hours), day of the week (e.g., the backup agent has a lower SLO and thus higher performance requirement in effect during the weekend days Saturday and Sunday, as compared to work week days Monday-Friday), calendar date (e.g., the backup agent has a lower SLO and thus higher performance requirement in effect during end of month and end or year processing), and the like.

In following paragraphs, described are techniques for specifying an SLO at a finer level of granularity than per application or at a finer level of granularity than per SG for use with I/Os from all applications. In at least one embodiment, different SLOs may be specified for use in connection with I/Os issued by different processes thereby providing a per-process level of SLO control (e.g., where a single application may have multiple processes issuing I/Os). Additionally, techniques herein provide for specifying different SLOs for particular process instances (e.g., per process instances). Still further, an embodiment in accordance with techniques herein may provide for specifying time dependent SLOs whereby such SLOs may vary with one or more time-dependent factors, such as time of day, day of the week, calendar date (e.g., particular dates of a particular month), and the like. The time dependent SLOs may vary at the application level, per application, as well as at the finer level of per-process granularity (where there are multiple processes executing in the context of a single application, different SLOs may be specified for each of the multiple processes of the same single application), and at an even finer level of per process instance granularity (e.g., where there are multiple instances of the same application process executing such as due to multiple instances of the same application issuing I/Os). In at least one embodiment, the MP driver on the host may receive each I/O for processing prior to sending the I/O to the data storage system for servicing. The processing performed by the MP driver may include storing a tag or indicator in each I/O sent to the data storage system. The tag may identify the particular process, as well as the particular process instance, which originated the I/O being processed by the MP driver. When the I/O is received on the data storage system from the host, the data storage system may use the tag to determine the appropriate SLO for the particular process denoted by the tag. Additionally, depending on one or more other factors such as time of day, day of the week (e.g., Monday or Saturday), date, and the like, the data storage system may select the appropriate SLO for a particular process instance having multiple specified time-dependent SLOs effective or enforced at different times, days, dates, and the like.

In at least one embodiment described herein for purposes of illustration, SLOs may be specified using the following service levels, from highest service or performance level to lowest service or performance level: DIAMOND (highest), GOLD, SILVER, BRONZE (lowest). Each of the foregoing service levels may have an associated SLO such as a specified RT goal. For example, DIAMOND may have a 1 millisecond RT goal, GOLD may have a 3 millisecond RT goal, SILVER may have a 5 millisecond RT goal and BRONZE may have a 10 millisecond RT goal. Also as noted, each of the foregoing service levels may have an associated target range with a minimum and maximum RT.

Referring back to FIG. 3, an application such as application 104 of the host 102, may include multiple processes each having a different process name. For example, the application 104 may be a database (DB) application which includes a first DBWRITER process that writes to the database (DB) stored on the data storage system and a second LOGWRITER process that writes to a log to log the database modification operations. The MP driver 106 on the host 102 receives the I/Os originating from both the first and second processes of the DB application whereby the MP driver knows which process originates each I/O it receives and then sends to the data storage system for processing.

In at least one embodiment in accordance with techniques herein, each process name for an application process (e.g., such as each of the above-noted first and second processes) includes multiple portions comprising a first portion and a second portion. In at least one embodiment, the first portion may denote the particular application process, such as the above-noted LOGWRITER process that writes to the log file for the database instance, or the above-noted DBWRITER process that writes to the database. The second portion of each process name may be an application instance specifier or identifier (ID). In at least one embodiment, the second portion of the process name may be customized for each application instance and may be user-specified or user configurable for each process of the particular application instance. For example, there may be two different instances of the same DB application executing on the same host. The two instances may be different instances of the same vendor-provided DB application. The first DB application instance may be used for marketing by the marketing department and the second DB application instance may be used for sales by the sales department.

Figure 5:
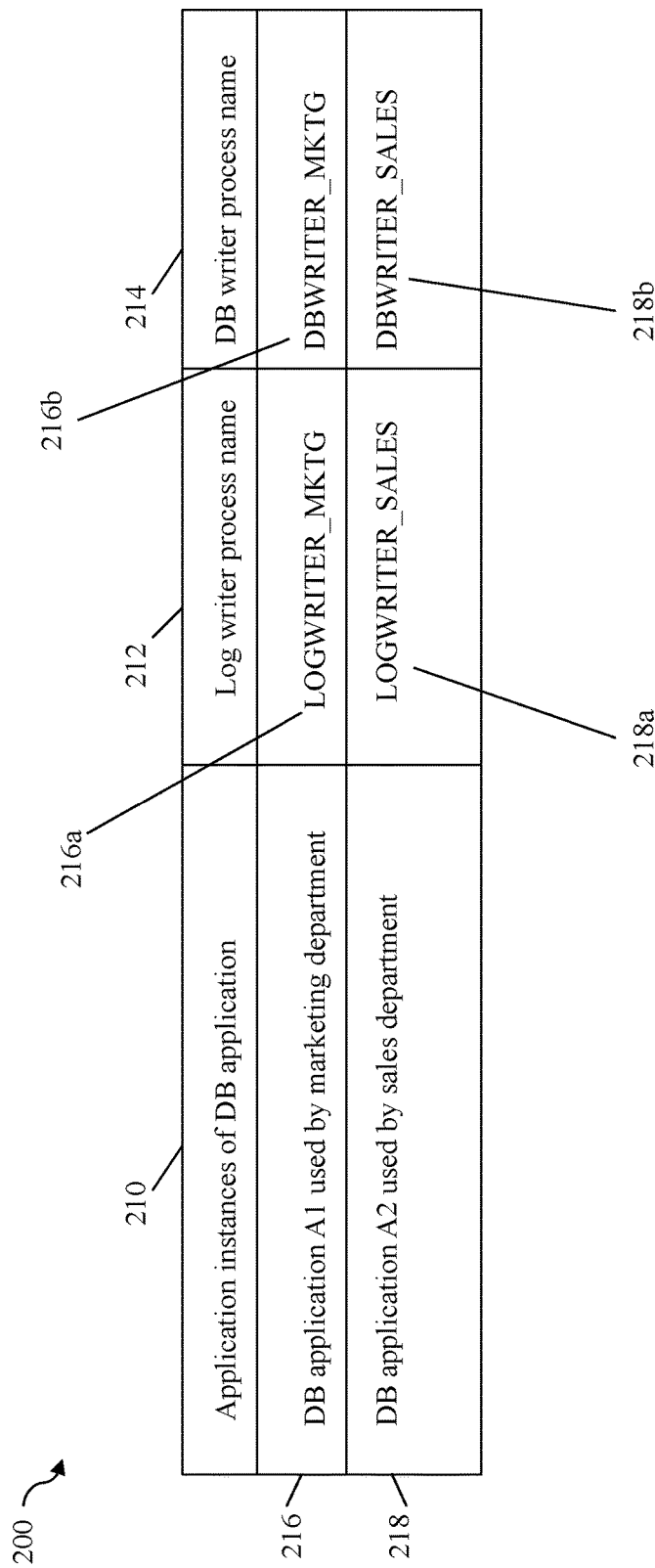

To further illustrate and referring now to FIG. 5, table 200 includes a first column 210 of application instances of the DB application, a second column 212 of log writer process names, and a third column of DB writer process names. Row 216 denotes the process names for the first DB application instance A1 and row 218 denotes the process names for the second DB application instance A2. The first instance A1 of the DB application used by marketing may have a LOGWRITER process with the process name of LOGWRITER_MKTG 216a, where "LOGWRITER" is the first portion of the process name and "MKTG" (denoting marketing) is the second portion of the LOG writer process name. The first instance A1 of the DB application used by marketing may have a DBWRITER process with the process name of DBWRITER_MKTG 216b, where "DBWRITER" is the first portion of the process name and "MKTG" (denoting marketing) is the second portion of the DB writer process name uniquely identifying the first instance of the DB application thereby enabling distinguishing between the first and second instances of the same DB application (e.g., such as between two instances of the DB application by the same DB vendor, such Oracle Corporation).

In a similar manner, the second instance A2 of the DB application used by sales may have a second LOGWRITER process with the process name of LOGWRITER_SALES 218a, where "LOGWRITER" is the first portion of the process name and "SALES" (denoting sales) is the second portion of the LOGWRITER process name. The second instance A2 of the DB application used by sales may have a DBWRITER process with the process name of DBWRITER_SALES 218b, where "DBWRITER" is the first portion of the process name and "SALES" (denoting sales) is the second portion of the DBWRITER process name uniquely identifying the second instance of the DB application (thereby enabling distinguishing between the first and second instances of the same DB application).

In this manner, the process name may include a first portion denoting the specific process of a particular application, and the second portion may further denote a particular unique instance of the specific process (as denoted by the first portion). Both DB application instances A1 and A2 are sending reads and/write I/O operations to log files and use of 216a, 218a allows for distinguishing between the particular application process instance (sales or marketing) of the LOGWRITER process of the DB application instance issuing I/Os. Similarly, both DB application instances A1 and A2 are sending reads and/or write I/O operations to the DB and use of 216b, 218b allows for distinguishing between the particular application process instance (sales or marketing) of the DBWRITER process issuing such DB I/Os.

Figure 6:
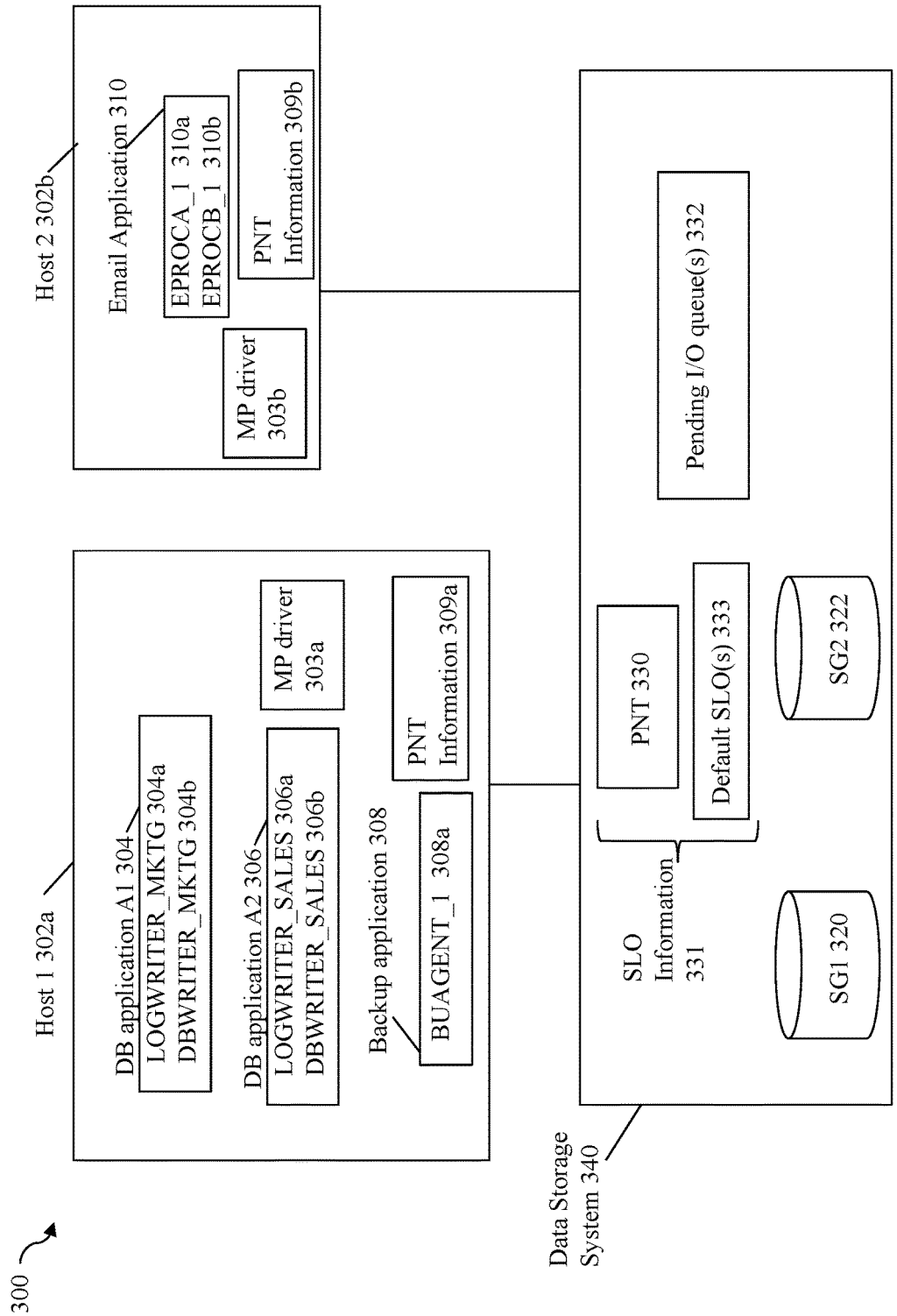

Referring to FIG. 6, shown is an example of components that may be used in an embodiment in accordance with techniques herein. The example 300 includes hosts 302a, 302b and data storage system 340, which may include additional components and may perform processing and operations as described in more detail elsewhere herein (e.g., as in connection with FIGS. 1, 2A, 2B, 3 and 4 for use in an embodiment in accordance with techniques herein). In this example, the host 1 302a may include two instances 304, 306 of the DB application such as described in connection with FIG. 5. The first instance of the DB application 304 is used by marketing and includes process 304a (having a process name like 216a) and process 304b (having a process name like 216b). The second instance of the DB application 306 is used by sales and includes process 306a (having a process name like 218a) and process 306b (having a process name like 218b). Also in this example are additional processes 308a, 310a and 310b which may have process names constructed in a manner similar to process names for 304a-b and 306a-b as discussed above in connection with FIG. 5. Host 1 302a also includes backup application 308 having the single process, BU AGENT 308a. Host 2 302b includes email application 310 having the two associated processes EPROCA_1 310a and EPROCB_2 310b. In particular, process names for each of the additional processes 308a, 310a, and 310b may include a first portion (e.g., denoting the particular application process) and a second portion (e.g., customized or configured to denote and identify the particular process instance), as described above.

The data storage system 340 includes two SGs—SG1 320 and SG2 322—each including one or more LUNs. SG1 includes LUNs used by DB application instances 304 and 306 as well as used by backup application 308. Thus, processes 304a-b, 306a-b and 308a issue I/Os directed to one or more LUNs included in SG1 320. SG2 includes LUNs used by email application 310. Thus, processes 310a-b issue I/Os directed to one or more LUNs included in SG2 322. The data storage system includes SLO information 331 comprising a process name table (PNT) 330 and default SLO information 333. Examples illustrating the PNT 330 and default SLO information 333 in more detail are discussed in following paragraphs in connection with FIG. 7. The data storage system also includes one or more pending I/O queues 332 of I/O received from hosts 302a, 302b which are waiting to be serviced or processed by the data storage system. In particular, the one or more queues 332 may include I/Os issued by any of processes 304a-b, 306a0b, 308a, 310a-b where such I/Os are received by the data storage system.

In at least one embodiment, a user may specify or enter SLO information 331 (e.g., such as using a user interface, configuration file, and the like) which is stored in the PNT 330 and default SLO information 333. In at least one embodiment, the SLO information 331 may be stored on the data storage system and the MP drivers 303a-b, respectively, on hosts 302a-b may read at least a portion of the PNT 330 for use by the MP drivers 303a-b. Element 309a may denote the PNT information read by MP driver 303a for use by MP driver 303a in connection with tagging I/Os issued by particular processes of host 302a. Element 309b may denote the PNT information read by MP driver 303b for use by MP driver 303b in connection with tagging I/Os issued by particular processes of host 302b. For example, MP driver 303a of host 302a may read information from PNT 330 including process names and associated tag values for each process name on host 302a (where the information read by 303a is stored as 309a); and MP driver 303b of host 302b may read information from PNT 330 including process names and associated tag values for each process name on host 302b (where the information read by 303b is stored as 309b).

Figure 7:
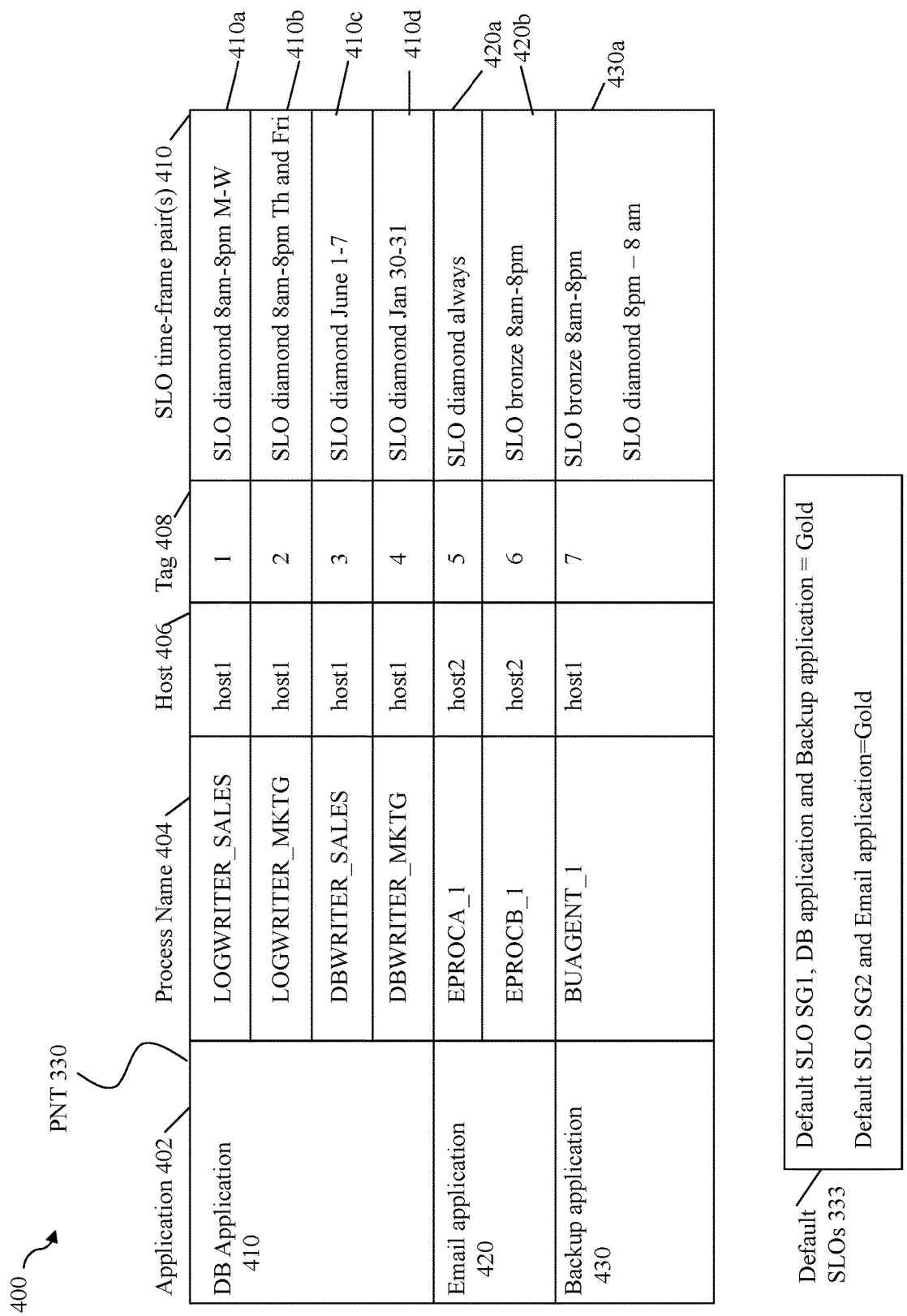

Referring to FIG. 7, shown is an example 400 illustrating in more detail information that may be stored in the PNT 330 and the default SLO information 333 for use in an embodiment in accordance with techniques herein.

PNT 330 includes the following columns of information-application 402, process name 404, host 406, tag 408 and SLO time-frame pair(s) 410. For each of the applications in column 402, the PNT 330 includes one or more associated entries where there is one entry per process name associated with the application. For example, for DB application 410, PNT 330 includes 4 entries 410a-d, respectively, for the processes 304a, 304b, 306a and 306b. For the email application 420, the PNT 330 includes two entries 420a-b, respectively, for processes 310a-b. For the backup application 430, the PNT 330 includes a single entry 430a for process 308a. Each of the entries 410a-d for a process of the DB application 410 identifies a process name 404, host 406 (upon which the process having the process name 404 executes), tag 408 (used to tag I/Os issued by the process name 404), and one or more SLO time-frame pairs 410 (identifying one or more modified SLOs for the particular process name issuing the I/O).

In connection with entry 410a for LOGWRITER_SALES process name, entry 410a indicates the process named LOGWRITER_SALES executes on host 1 (406), has associated tag value 1 (408) and has a single modified time-dependent SLO 410 where the SLO for I/Os received at the data storage system between 8am-8 pm Monday-Wednesday has a DIAMOND level SLO.

In connection with entry 410b for LOGWRITER_MKTG process name, entry 410b indicates the process named LOGWRITER_MKTG executes on host 1 (406), has associated tag value 2 (408) and has a single modified time-dependent SLO 410 where the SLO for I/Os received at the data storage system between 8am-8 pm Thursday and Friday has a DIAMOND level SLO.

In connection with entry 410c for DBWRITER_SALES process name, entry 410c indicates the process named DBWRITER_SALES executes on host 1 (406), has associated tag value 3 (408) and has a single modified time-dependent SLO 410 where the SLO for I/Os received at the data storage system any time on June 1-7 of the calendar yeast has a DIAMOND level SLO.

In connection with entry 410d for DBWRITER_SALES process name, entry 410d indicates the process named DBWRITER_MKTG executes on host 1 (406), has associated tag value 4 (408) and has a single modified time-dependent SLO 410 where the SLO for I/Os received at the data storage system any time on January 30-31 of the calendar yeast has a DIAMOND level SLO.

In connection with entry 420a for EPROCA_1 process name, entry 420a indicates the process named EPROCA_1 executes on host 2 (406), has associated tag value 5 (408) and has a single modified time-dependent SLO 410 where the SLO for I/Os received at the data storage system is always a DIAMOND level SLO.

In connection with entry 420b for EPROCB_1 process name, entry 420b indicates the process named EPROCB_1 executes on host 2 (406), has associated tag value 6 (408) and has a single modified time-dependent SLO 410 where the SLO for I/Os received at the data storage system any day between 8am-8 pm is a BRONZE level SLO.

In connection with entry 430a for BUAGENT_1 process name, entry 430a indicates the process named BUAGENT_1 executes on host 1 (406), has associated tag value 7 (408) and has a two modified time-dependent SLOs 410 where the SLO for I/Os received at the data storage system any day between 8am-8 pm is a BRONZE level SLO and the SLO for I/Os received at the data storage system any day between 8 pm and 8 am is a DIAMOND level SLO.

Default SLOs 333 include default SLO values used for SLOs for I/O received at the data storage system. Such default SLOs 333 may be modified or overridden by a different SLO of PNT 330 which is effective or active (e.g., for which the time-dependent SLO criteria is applicable) for a specified tagged I/O having a particular tag value. In this example, a default SLO of GOLD is specified for each of the applications (DB application, backup application and email application) and a default SLO of GOLD is also specified for each of the SGs, SG1 and SG2.

For example, MP driver 303a of host 302a of FIG. 6 may read the information in columns 404 and 408 from the PNT 330 relevant to host 1 302a (e.g., values of 404 and 408 from entries 410a-d and 430a) so that the MP driver 303a knows what particular tag value to place in I/Os issued by various executing processes 304a-b, 306a-b and 308a on the host 302a. To further illustrate with reference back to FIG. 6, MP driver 303a receives a first I/O from process name LOG-WRITER_MKTG 304a and looks up the process name LOGWRITER_MKTG in its process name and associated tag value as stored in PNT information 309a and determines that the process name LOGWRITER_MKTG has an associated tag value of 1. The MP driver 303a then places the tag value of 1 in the first I/O prior to issuing the first I/O to the data storage system 340 for processing. In at least one embodiment using block-storage I/Os in accordance with the SCSI standard, the tag value may be placed in a command data block (CDB) header of the I/O operation. The first I/O is received by the data storage system 340 where processing is performed using the PNT 330. In particular, the data storage system retrieves the tag value of 1 from the first I/O and may use it as an index into the PNT 330 to identify the particular row 410a with SLO and other information associated with the tag value of 1. The processing further includes retrieving the SLO information 410 from entry 410a associated with tag value 1. Assume that the first I/O is received on the data storage system at 3 pm on Monday thereby making the DIAMOND SLO denoted by column 410 of entry 410a active or effective for the first I/O. In this case, the first I/O is processed using the elevated level of DIAMOND SLO. Otherwise, for example, if the first I/O was received at a date/time outside the specified window of 8 am-8 pm Monday-Wednesday, a default SLO may be used. In this example, a default SLO of GOLD may be obtained from 333 whereby GOLD is the SLO level of service applied or effective for the first I/O. In at least one embodiment, a default SLO may be specified for each SG, such as a first default SLO for SG1 and a second default SG for SG2. As a variation, an embodiment may specify a default SLO per application that issues I/Os. In such an embodiment, the MP driver may tag the I/O with an indicator denoting the particular application, such as DB application, which issued the I/O. As discussed above, the MP drivers are able to perform such I/O tagging with an indicator identifying the particular application such as based on process name. For example, the MP driver may know the particular first portion of each process name of each of the applications (e.g., DB application has a process names with first portions of either LOGWRITER or DBWRITER). On the data storage system receiving the I/O, the indicator denoting the application may be retrieved and used to find a corresponding default application level SLO in the default SLO information 333. For example, in such an embodiment, the default SLO information 333 may specify a default SLO for each of the different application indicators that may appear in an I/O tagged with an application indicator. It should be noted that an embodiment may also include and use both the application level indicators and associated application level SLOs along with an SG level default SLO. In such an embodiment, the SG level default SLO may be used as a last fallback position for SLO determination, for example, if the I/O is not tagged with an application indicator and if the I/O is not tagged with a tag value denoting a process have an effective or active time-dependent SLO of 410 (e.g., the priority of SLO determination is to use the SLO associated with a process name. If no such SLO is effective or applicable, an application level-SLO may be used for the I/O. If no application level SLO can be determined (e.g., the I/O is not tagged with an application level indicator), then the SG-level default SLO may be used for the I/O.

Figure 8:
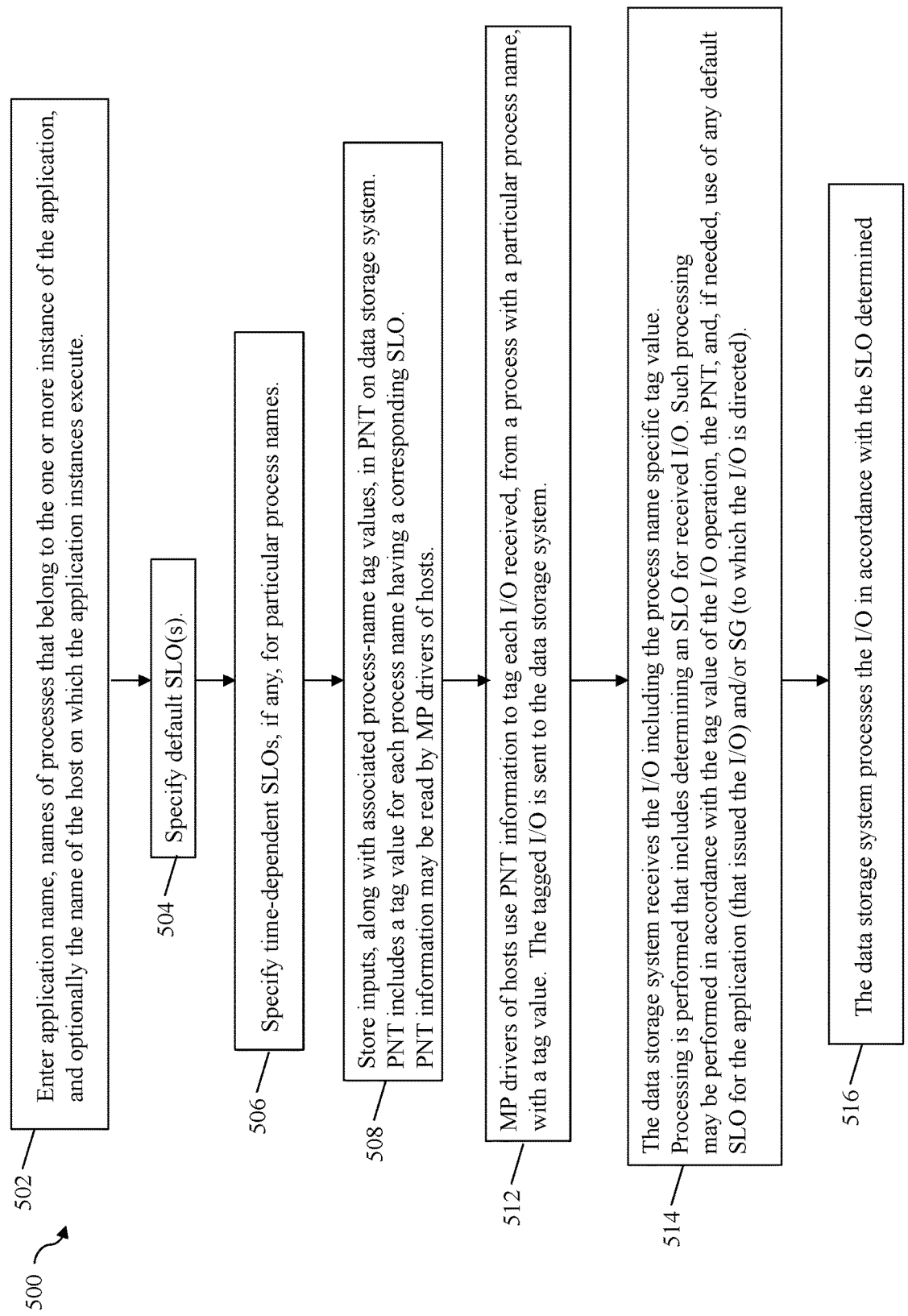
FIG. 8 is a flowchart of process steps that may be performed in an embodiment in accordance with techniques herein.

Referring to FIG. 8, shown is a flowchart 500 of processing steps that may be performed in an embodiment in accordance with techniques herein. At step 502, a user enters each application name, the names of the processes that belong to each instance of that application and, optionally, the name of the host upon which the application instances and associated processes are running. As described above, the process name may include a first fixed or generic portion denoting the particular process of the application, and a second portion that may be configured or customized, such as by the user. The second portion may denote or differentiate between particular instances of the same process of the same application. At step 504, default SLOs may be specified. As discussed above, such default SLOs may include a default SLO for each SG and/or default SLO for each application. In at least one embodiment, such default SLOs may be used in connection with all I/Os which are not tagged with process-name specific tag values, or for I/Os for which a process-name specific tag value may not be active or effective since associated time-dependent criteria may not be met in connection with the current time at which the I/O is processed or received. At step 506, time-dependent SLOs, if any, are specified for particular process names. In connection with step 506, if a process having a particular process name requires a time variable SLO where a different customized SLO for the process name is needed at different points in time, the user specifies the process name, time frames and SLO for each time frame. For example, a first process of a particular application (where the first process has a first process name) may require (relative to the default application or SG SLO) increased performance during business hours of a particular day of the week and decreased performance (relative to the generic SLO) on weekends. In this manner, two time dependent SLOs and associated time-frames (e.g., time dependent criteria denoting when the SLO is effective) may be specified for the above-noted first process name, where a first may indicate DIAMOND SLO for increased performance during business hours of a particular day of the week and a second may indicate BRONZE SLO for decreased performance (relative to the generic SLO) on weekends. At step 408, the user inputs (from steps 502, 506 and 508 noted above) are recorded in the PNT where the PNT is stored on the data storage system and read by the MP driver on each host that sends I/Os to the data storage system. The PNT may be as described above and illustrated in connection with FIGS. 6 and 7, where the PNT includes a different unique tag for each such process name. In at least one embodiment, the tag associated with a particular process name may uniquely identify and distinguish each of the process names from the others also listed in the PNT. At step 512, an MP driver on a host receives an I/O that is issued by a particular process of an application. For each such I/O received by the MP driver, the MP driver locates the sending process name in the PNT information to obtain the corresponding unique tag for that process name. The MP driver then stores the tag value in the I/O which is then sent to the data storage system. At step 514, the data storage system receives the I/O operation including the tag representing the process name. Also in step 514, processing is performed that includes determining an SLO for the received I/O where such processing may be performed in accordance with the tag value for the process name of the I/O operation, the PNT and, if needed, use any default SLO for the application (that issued the I/O) and/or SG (to which the I/O is directed). In connection with step 514 and consistent with other discussion herein, the data storage system obtains, from the PNT, the SLO appropriate for this I/O operation based on the tag of the I/O operation. In this manner, the data storage system uses the I/O operation tag and the PNT to identify the particular application process that originated the I/O operation. The data storage system retrieves from the PNT the one or more SLOs specified for the particular tag of the I/O operation. If the PNT includes multiple SLOs specified for the single tag of the I/O operation, it means that there are time-dependent SLOs for the associated process and the data storage system further uses current time dependent information, such as time of day, day of the week, month of the year, date of the month, calendar date, and the like, to further select the appropriate SLO of the multiple SLOs associated with the tag. If no SLO from the PNT is effective or active for the received I/O, a default SLO may be used for processing the received I/O. In step 516, the data storage system processes the received I/O in accordance with the SLO determined in step 514.

In at least one embodiment, the SLO determined for an I/O may be used to determine priority for the I/O with respect to other pending I/Os waiting to be processed. In at least one embodiment, the data storage system may have a queue of pending I/Os (e.g., 332 of FIG. 6) waiting to be processed or serviced. Each I/O on the queue may have an indication of priority and the queue may be sorted or ordered based on the priority associated with each queued I/O. In at least one embodiment, the priority of each I/O may be denoted by an amount of time T associated with each I/O on the queue. The time T may denote an amount of time remaining (with respect to the current time) within which the I/O is expected to be completed to meet a specified time performance goal associated with the queued pending I/O. In at least one embodiment, a RT associated with the SLO specified for a pending I/O may be used as the time T associated with the I/O when in the queue. For example, as discussed elsewhere herein, GOLD SLO may have an associated performance goal or RT target of 3 milliseconds. The I/O is ordered or prioritized with respect to other pending I/Os based on current T values associated with the pending I/Os. An I/O with a GOLD SLO may be initially assigned a T value of 3 milliseconds and then placed in a particular position in the queue based on its T value relative to other T values of other pending I/Os.

Processing may be performed to maintain the list in the sorted order where the I/Os having the lowest associated time T are ordered as the highest priority I/Os in the queue (e.g., ordered or prioritized from lowest to highest times T associated with I/Os of the queue). At defined time intervals of elapsed time, such as every 1 millisecond, processing may be performed to decrement the associated time T for each pending I/O in the queue by the elapsed time such as 1 millisecond. Thus, those existing I/Os already in the queue may have their priority increased/adjusted as new pending I/Os are subsequently added to the queue. It should be noted that the queue of pending I/Os 332 may be implemented using any suitable data structure(s) known in the art, such as a linked list, doubly linked list, and the like. Additionally, an embodiment may further include multiple queues of pending I/Os, for example, where a different queue may be associated with each LUN (e.g., or a specified group of multiple LUNs) to which I/Os may be directed.

In connection with the foregoing, the SLO associated with an I/O received at the data storage system may be determined using the PNT table as discussed elsewhere herein. For an I/O directed to a target LUN, if there is no relevant process name tag or no effective or active process name level SLO (e.g., time at which I/O is received does not meet specified time-dependent SLO criteria), then a default SLO may be used as the time T for the I/O when placed in the queue. As described herein, the default SLO may be an application level default SLO, or an SG-specific default SLO associated with the target LUN (e.g., SG to which the target LUN belongs).

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
   issuing, by a process of an application on a host, an I/O operation;
   tagging the I/O operation with a tag value, wherein the tag value is determined in accordance with a process name associated with the process that issued the I/O operation, and wherein said tagging includes storing the tag value in the I/O operation;
   sending the I/O operation including the tag value from the host to a data storage system; and
   determining, on the data storage system, a service level objective for the I/O operation in accordance with the tag value included in the I/O operation.

2. The method of claim 1, wherein said tagging is performed by a multi-path I/O driver of the host.

3. The method of claim 1, wherein the tag value is used to distinguish between different processes.

4. The method of claim 1, wherein the tag value is used to distinguish between different instances of a same process.

5. The method of claim 1, wherein the process name includes a first portion and a second portion, and wherein the first portion denotes a particular process of the application and the second portion is a customized portion denoting a particular instance of the application.

6. The method of claim 5, wherein the host includes two instances of the application and two different instances of a same process, the process, executing on the host, and wherein the second portion of the process name is used to distinguish between the two different instances of the same process of the application.

7. The method of claim 1, further comprising:
receiving the I/O operation at the data storage system; and
responsive to receiving the I/O operation, performing first processing that determines the service level objective for the I/O operation in accordance with the tag value of the I/O operation.

8. The method of claim 7, wherein a table includes entries of process names and, for each process name, an associated tag value and one or more associated service level objective-time frame pairs.

9. A method of processing I/O operations comprising:
issuing, by a process of an application on a host, an I/O operation;
tagging the I/O operation with a tag value in accordance with a process name associated with the process that issued the I/O operation;
sending the I/O operation from the host to a data storage system; and
determining, on the data storage system, a service level objective for the I/O operation in accordance with the tag value of the I/O operation;
receiving the I/O operation at the data storage system; and
responsive to receiving the I/O operation, performing first processing that determines the service level objective for the I/O operation in accordance with the tag value of the I/O operation, wherein a table includes entries of process names and, for each process name, an associated tag value and one or more associated service level objective-time frame pairs, and wherein the table includes a first entry for the process name and the first processing further comprises:
determining, using the table and the tag value of the I/O operation, at least one associated service level objective-time frame pair, wherein the at least one associated service level object-time frame pair specifies a service level that is active or effective or the process name at particular points in time in accordance with time-specific criteria.

10. The method of claim 9, wherein the time-specific criteria includes any of: a particular day of a week, a particular date, a particular time of day, and a particular calendar day.

11. The method of claim 9, wherein the first processing includes:
determining that the at least one associated service level objective-time frame pair is currently not active or effective for the I/O operation whereby the I/O operation is received at the data storage system at a time which does not meet the time-specific criteria of the at least one associated service level objective-time frame pair; and
responsive to determining that the at least one associated service level objective-time frame pair is currently not active or effective for the I/O operation, using a default service level objective for processing the I/O operation.

12. The method of claim 11, wherein the at least one associated service level objective-time frame pair specifies a higher service level objective than the default service level objective, and wherein the higher service level objective is active or effective when the time-specific criteria is met by the I/O operation.

13. The method of claim 11, wherein the at least one associated service level objective-time frame pair specifies a lower service level objective than the default service level objective, and wherein the lower service level objective is active or effective when the time-specific criteria is met by the I/O operation.

14. A system comprising:
at least one processor; and
a memory comprising code stored therein that, when executed by the at least one processor, performs a method of processing I/O operations comprising:
issuing, by a process of an application on a host, an I/O operation;
tagging the I/O operation with a tag value, wherein the tag value is determined in accordance with a process name associated with the process that issued the I/O operation, and wherein said tagging includes storing the tag value in the I/O operation;
sending the I/O operation including the tag value from the host to a data storage system; and
determining, on the data storage system, a service level objective for the I/O operation in accordance with the tag value included in the I/O operation.

15. A computer readable medium comprising code stored thereon that, when executed, performs a method of processing I/O operations comprising:
issuing, by a process of an application on a host, an I/O operation;
tagging the I/O operation with a tag value, wherein the tag value is determined in accordance with a process name associated with the process that issued the I/O operation, and wherein said tagging includes storing the tag value in the I/O operation;
sending the I/O operation including the tag value from the host to a data storage system; and
determining, on the data storage system, a service level objective for the I/O operation in accordance with the tag value included in the I/O operation.

16. The computer readable medium of claim 15, wherein said tagging is performed by a multi-path I/O driver of the host.

17. The computer readable medium of claim 15, wherein the tag value is used to distinguish between different processes.

18. The computer readable medium of claim 15, wherein the tag value is used to distinguish between different instances of a same process.

19. The computer readable medium of claim 15, wherein the process name includes a first portion and a second portion, and wherein the first portion denotes a particular process of the application and the second portion is a customized portion denoting a particular instance of the application.

20. The computer readable medium of claim 19, wherein the host includes two instances of the application and two different instances of a same process, the process, executing on the host, and wherein the second portion of the process name is used to distinguish between the two different instances of the same process of the application.

* * * * *